United States Patent [19]

Piazzola

[11] Patent Number: 4,634,361
[45] Date of Patent: Jan. 6, 1987

[54] HEAT TRANSFER MEANS TO BE INSTALLED AROUND THE BARREL OF AN EXTRUDER OR INJECTION MOLDING MACHINE

[76] Inventor: Gaetano Piazzola, Viale Borri, 148, Varese, Italy

[21] Appl. No.: 700,511

[22] Filed: Feb. 11, 1985

[30] Foreign Application Priority Data

Feb. 14, 1984 [IT] Italy .................. 19610 A/84

[51] Int. Cl.$^4$ .................. B29C 45/72; B29C 47/78
[52] U.S. Cl. .................. 425/190; 165/122; 366/149; 425/547
[58] Field of Search .................. 425/547, 384, 378 R, 425/378 S, 182, 190; 366/144, 149; 165/122

[56] References Cited

U.S. PATENT DOCUMENTS

| | | | |
|---|---|---|---|
| 2,200,502 | 5/1940 | Johnson | 165/109 |
| 3,743,252 | 7/1973 | Schott | 425/378 R |
| 4,072,185 | 2/1978 | Nelson | 165/122 |

FOREIGN PATENT DOCUMENTS 0211428  12/1983  Japan .................. 425/378

Primary Examiner—Willard E. Hoag
Attorney, Agent, or Firm—Bucknam and Archer

[57] ABSTRACT

The apparatus substantially comprises two semicylindrical structures therebetween a gap is defined provided, at opposite positions, with cooled air inlet and outlet ports. The gap encompasses the portion of the machine to be cooled and/or temperature controlled, the air circulation being assured by fans arranged, together with the cylindrical structures, in a box-shaped body consisting of two vertically extending opposite walls supported by the extruder cylinder and being closed, at the top and on its sides, by a removable casing, in such a way as to define, on the sides of the semicylindrical structures, cooling air circulation ducts therealong air flows before arriving at the gap defined by the semicylindrical structures.

1 Claim, 2 Drawing Figures

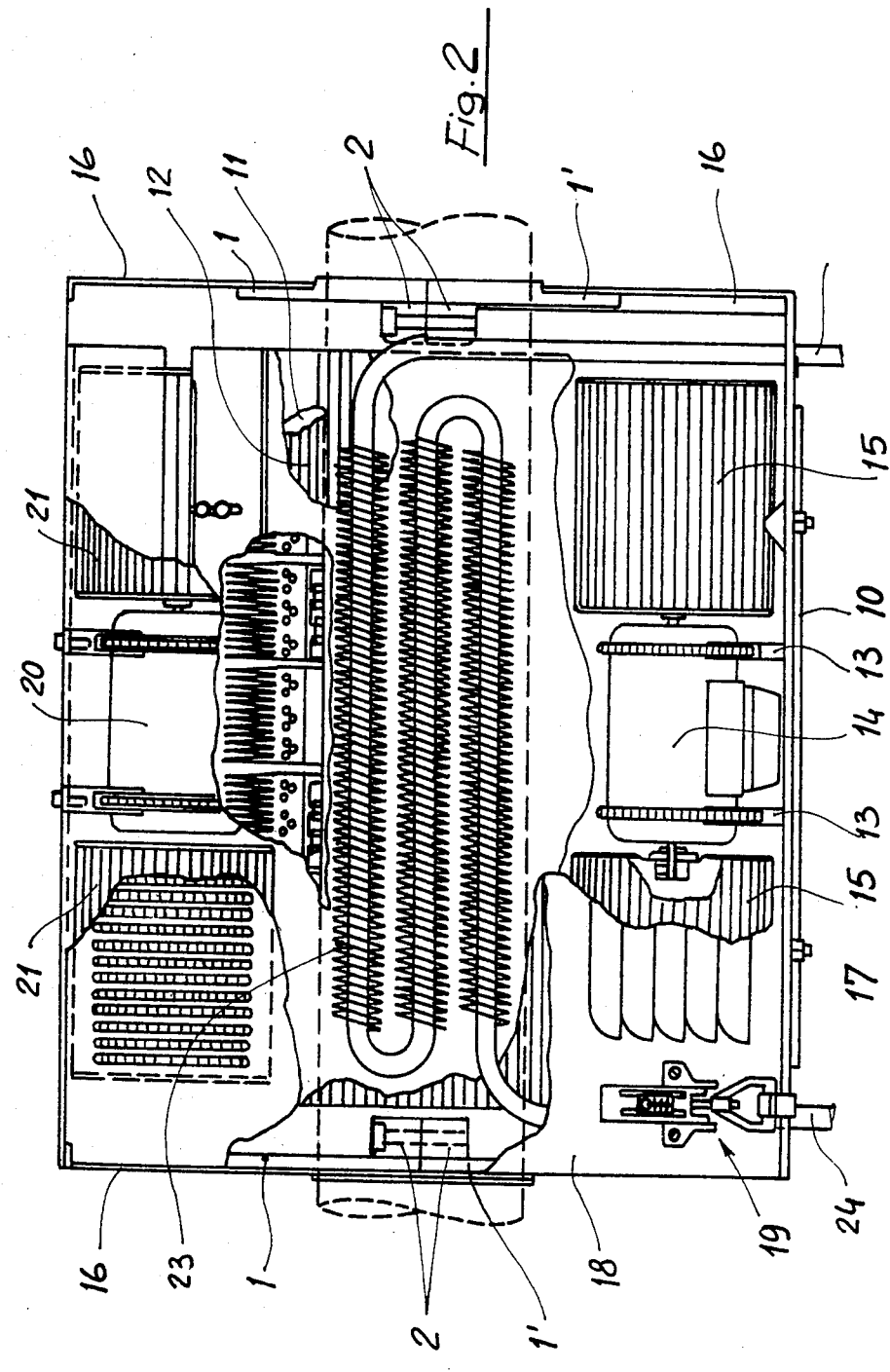

HEAT TRANSFER MEANS TO BE INSTALLED AROUND THE BARREL OF AN EXTRUDER OR INJECTION MOLDING MACHINE

BACKGROUND OF THE INVENTION

The present invention relates to a cooling and/or temperature control apparatus to be applied on extruder cylinders for injection moulding presses and drawing machines, or machines for processing plastics materials, rubber materials and the like.

As it is known, for carrying out plastics and elastomeric material processing operations there are provided specifically designed machines (extruders, injection presses, drawing machines and the like), which essentially comprise a screw member effective to revolve with a small clearance within a coaxially extending cylinder.

The latter is usually provided with heating means as controlloed by suitable temperature controlling systems.

It is also known that, as the mentioned machines for processing plastics and the like materials are used in comparatively high temperature places, said machines are easily susceptible to malfunctions.

In such a case, the efficiency of the machine falls to very low values with a consequent increase of the unit cost of the products.

Several approaches have been proposed to hold the temperature of the operating component parts of said machines within acceptable limits.

However the mentioned approaches have not been felt as satisfactory.

SUMMARY OF THE INVENTION

Accordingly, the task of the present invention is to provide such a cooling and/or temperature control apparatus which is effective to drastically reduce the operation temperature of the operating members in machines for processing plastics and elastomeric materials, even in high temperature environmental conditions.

Within that task, it is a main object of the present invention to provide such a cooling and/or temperature control apparatus the component members of which are easily available, to permit a quick maintenance of the assembly and facilitate the maintenance operations.

Another object of the present invention is to provide such a cooling and temperature control apparatus which is construction-wise simple and greatly reliable and effective to be extended through the overall extension of the apparatus to be temperature controlled.

According to one aspect of the present invention the above task and objects, as well as yet other objects which will become more apparent thereinafter are achieved by a cooling and/or temperature control apparatus to be applied on extruder cylinders for injection molding presses and drawing machines, or machines for processing plastics materials, rubber materials and the like, characterized in that it essentially comprises two semicylindrical structures effective to define, about the extruder cylinder, a gap provided, at opposite portions, with two discontinuities, respectively for the inlet and outlet of the cooling and/or temperature control air, being circulated in a forced or tight way, said air, as taken from the outside by one or more sucking fans, being conveyed toward other circulating fans or circulated in the inside in such a way as to touch, in its path, cooling coils and flow, through said inlet, into the gap encompassing said extruder cylinder, said fans and coils being enclosed in a removable casing also including said semicylindrical structures and defining, with the latter, ducts for the passage therethrough of the sucken air.

In particular, the inner surface of the mentioned semicylindrical structures is coated by an insulating material layer, thereon there is arranged a corrugated sheet metal, of the reflecting type, preferably made of stainless steel.

BRIEF DESCRIPTION OF THE DRAWINGS

Further characteristics and advantages of the cooling and/or temperature control apparatus according to the present invention will become more apparent thereinafter from the following detailed description of a preferred embodiment of said apparatus, being illustrated, by way of an indicative example, in the accompanying drawings, where:

FIG. 2 is a side broken away view illustrating that same apparatus.

DESCRIPTION OF THE PREFERRED EMBODIMENT

Figure 1:
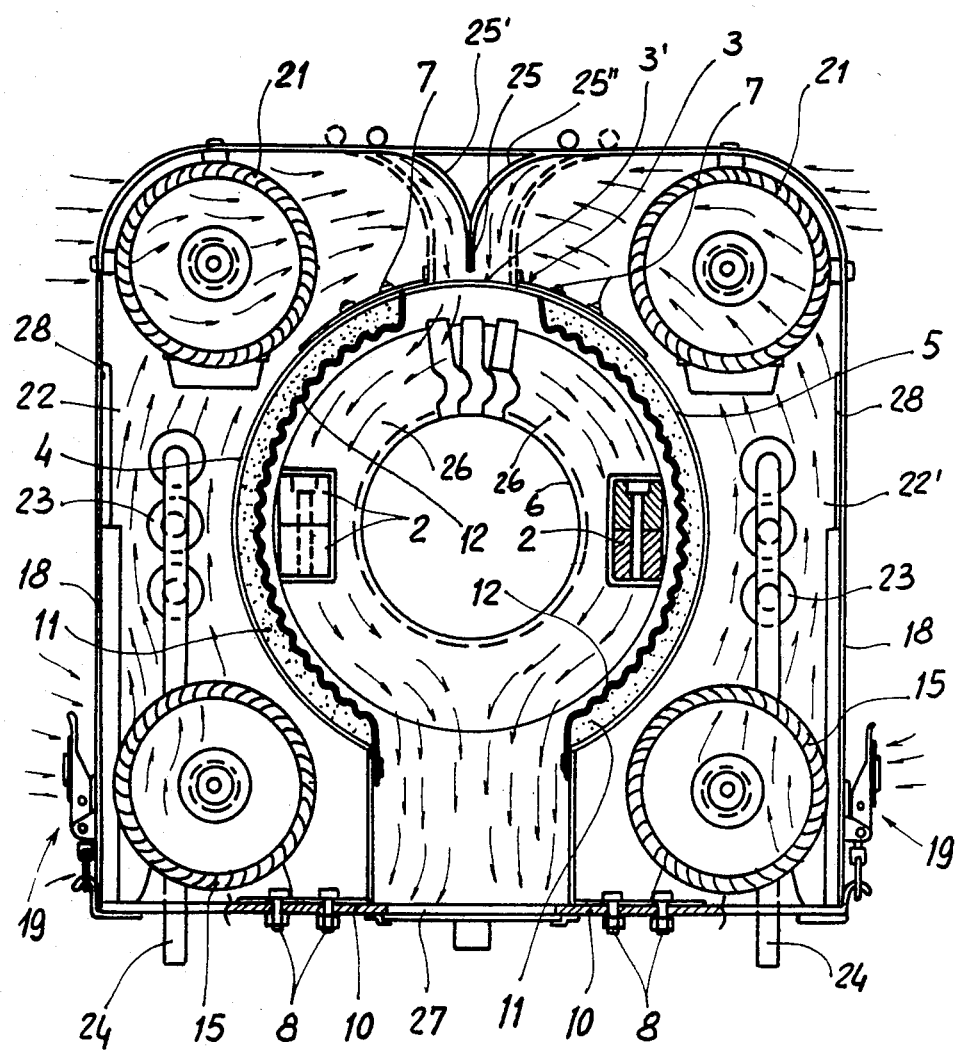
FIG. 1 is a schematic front view illustrating the cooling and/or temperature control apparatus according to the present invention therefrom a closure wall has been removed.

With reference to the figures of the accompanying drawings, the cooling and/or temperature control apparatus according to the present invention comprises two half-ring pairs 1 and 1', coupled by means of coupling blocks 2.

Between said half-ring pairs there are mounted, through an arcuate plate 3, provided with an intermediate longitudinally extending slot 3', two structures 4 and 5 which jointly form a collar provided for being coaxially arranged with respect to the extruder cylinder 6.

More specifically, the mentioned structures are coupled to said arcuate plate 3 by means of bolts 7 passing through slots as formed in said plate.

The lower portion, which is right angle bent, of said structures is in turn coupled, also by means of bolts 8 passing through corresponding slots 9, to a base plate 10.

Thus it will be possible to vary, depending on the needs, the distance of the two structures 4 and 5 from the extruder cylinder.

In particular, the two mentioned structures carry, at the curved portions whereof, of cylindric sector shape, an insulating material layer 11, covered by a corrugated sheet metal 12, effective to act as a mirror reflecting member.

On the two side portions of the base plate 10, adjoining the right angle bent portions of said structures 4 and 5 there is mounted, at an intermediate position, and through suitable supporting members 13, a motor 14 the shaft whereof, extending from the two sides of the motor itself, carries corresponding sucking fans 15.

On the edges of the mentioned side portions of the base plate there are arranged two vertically extending walls 16, supported by the mentioned half-rings 1 and 1'.

The mentioned two vertically extending walls, together with the base plate, define a box-like body—open at the two sides parallel to the extruder cylinder—which is closed, on the sides and top, by a casing 18 provided, at the fans 15, with suitable sucking ports 17.

That casing may be coupled to the base plate by means of tension hook members 19 and bears, at its top wall and symmetrically with respect to said motors 14, corresponding motors 20 driving respective fan pairs 21.

The mentioned casing essentially defines, on the sides of the structures 4 and 5, two vertically extending ducts 22 and 22', therealong the air flows as drawn from the outside by said fans 15.

In particular, inside said ducts there is arranged a respective cooling coil 23 supplied, through the ducts 24, with a low temperature liquid (such as cooled water, oil . . . ).

Moreover, the top wall of the mentioned casing is provided, at an intermediate position, with a baffle member 25, preferably of the adjustable type and effective to convey the cooled air into the gaps 26 defined, about the extruder cylinder 6, by the collar structures 4 and 5. The mentioned member 25 which, in addition to being adjustable is also splittable into two portions 25' and 25", is able of shutting off the ducts 26 in such a way as to affect the air amount, its speed or flow rate and accordingly the temperature of the air passing through the ducts 26.

That cooled air, after having touched the extruder cylinder 6, in such a way as to cool it, is pushed, by the fresh air forced by said fans, through a suitable port 27 as formed through the base plate.

The casing, in particular, may be coated, in turn, at least partially, by an insulating material layer 28.

It should moreover be pointed out that the possibility of removing said casing facilitates the inspection and the possible maintenance of the cooling and/or temperature control apparatus according to the present invention.

From the above disclosure and from the figures of the accompanying drawings, the great functionality and use facility characterizing the cooling and/or temperature control apparatus to be applied on extruder cylinders for injection moulding presses and drawing machines, or machines for processing plastics materials, rubber materials and the like, according to the present invention, will be self-evident.

While a preferred embodiment of the apparatus according to the present invention has been thereinabove disclosed and illustrated, it should be apparent that it is susceptible to several modifications and variations all of which come within the scope of the invention, as defined in the accompanying claims.

I claim:

1. A heat transfer apparatus to be applied about a barrel of an extruder or injection molding machine, comprising: two adjustable semicylindrical structures having means for defining, when positional about one said barrel, a gap defining at opposite positions, two openings, for entrance of cooling air to the apparatus and one opening for exit of air form the apparatus, air induction fans for introducing outside air to the apparatus, air-circulation fans to circulate air within the apparatus, cooling coils to cool the circulated air, said fans and coils being enclosed in a removable casing also enveloping said semicylindrical structures, said semicylindrical structures being provided with a respective right angle bent end defining a collar for positioning said structure axial with respect to said barrel, said semicylindrical structures being adjustably mounted, on an arcuate plate member arranged between two half ring pairs, coupled through coupling blocks for support by said barrel, said right angle bent ends being coupled to side portions of a base plate on the side adjoining said structures, there being mounted, at an intermediate position of said base plate a motor the driving shaft of which extends on the two sides of the motor and connected to corresponding said fans, on the edges of said side portions of said base plate there being provided vertically extending walls supported by said half-rings and provided, at said fans, with air inlet ports, said vertically extending walls defining, with said base plate, a box like body open on the two sides parallel to said barrel and closed, on the sides and top, by said casing, said casing being coupled to said base plate by means of tension hook members and carrying on its top wall, symmetrically with respect to said motors, corresponding motors driving fan pairs, said casing defining, laterally of said semicylindrical structures, two substantially vertically extending ducts in the inside of which there is arranged said cooling coil, said top wall of said casing being provided, at an intermediate position with a two-portion splittable baffle member to convey the cooled air to the space encompassing said barrel and defined by said semicylindrical structures.

* * * * *